US012671501B2

(12) United States Patent
Hanay et al.

(10) Patent No.: US 12,671,501 B2
(45) Date of Patent: Jun. 30, 2026

(54) TRANSMITTING DEVICE AND METHOD FOR TRANSMITTING A BROADBAND OPTICAL TRANSMISSION SIGNAL

(71) Applicant: RHEINISCH-WESTFALISCHE TECHNISCHE HOCHSCHULE (RWTH) AACHEN, Aachen (DE)

(72) Inventors: Oner Hanay, Aachen (DE); Erkan Bayram, Aachen (DE); Renato Negra, Aachen (DE)

(73) Assignee: RHEINISCH-WESTFALISCHE TECHNISCHE HOCHSCHULE AACHEN (RWTH) AACHEN, Aachen (DE)

( * ) Notice: Subject to any disclaimer, the term of this patent is extended or adjusted under 35 U.S.C. 154(b) by 255 days.

(21) Appl. No.: 18/570,802

(22) PCT Filed: May 20, 2022

(86) PCT No.: PCT/EP2022/063767
§ 371 (c)(1),
(2) Date: Dec. 15, 2023

(87) PCT Pub. No.: WO2023/274626
PCT Pub. Date: Jan. 5, 2023

(65) Prior Publication Data
US 2024/0283542 A1 Aug. 22, 2024

(30) Foreign Application Priority Data

Jun. 30, 2021 (DE) ..................... 10 2021 206 873.1
Jul. 14, 2021 (DE) ..................... 10 2021 207 501.0

(51) Int. Cl.
*H04B 10/556* (2013.01)
*H04B 10/50* (2013.01)

(52) U.S. Cl.
CPC ....... *H04B 10/556* (2013.01); *H04B 10/5053* (2013.01); *H04B 10/5055* (2013.01); *H04B 10/506* (2013.01)

(58) Field of Classification Search
None
See application file for complete search history.

(56) References Cited

U.S. PATENT DOCUMENTS

| | | | |
|---|---|---|---|
| 2012/0224856 A1* | 9/2012 | Sato ..................... | H04B 10/516 398/79 |
| 2015/0030333 A1 | 1/2015 | Sun et al. | |
| 2016/0043852 A1* | 2/2016 | Su ......................... | H04L 5/0098 398/52 |

OTHER PUBLICATIONS

International Search Report and Written Opinion dated Oct. 18, 2022, for International Application PCT/EP2022/063767.

* cited by examiner

*Primary Examiner* — David W Lambert
(74) *Attorney, Agent, or Firm* — The Dobrusin Law Firm, P.C.

(57) ABSTRACT

A transmitting device for transmitting a broadband optical transmission signal via an optical waveguide, having an electronic subsystem and an optical subsystem, the optical subsystem has N electro-optic modulators for providing N optical signal components, where N is a number greater than 1, the electronic subsystem is configured to transform a baseband signal by a Fourier transform, or a discrete Fourier transform, into a frequency spectrum containing N digital coefficient signals, and to provide, on a basis of the N digital coefficient signals, N analog coefficient signals, and the electro-optic modulators of the optical subsystem are configured to be driven each by one of the N analog coefficient signals.

12 Claims, 3 Drawing Sheets

TRANSMITTING DEVICE AND METHOD FOR TRANSMITTING A BROADBAND OPTICAL TRANSMISSION SIGNAL

CROSS-REFERENCE TO RELATED APPLICATIONS

This application is a US National Stage of PCT/EP2022/063767 filed on May 20, 2022 which claims priority to DE 10 2021 206 873.1 filed on Jun. 30, 2021 and to DE 10 2021 207 501.0 filed on Jul. 14, 2021, all of which are hereby incorporated by reference herein for all purposes.

FIELD OF THE INVENTION

The present invention relates to a transmitting device for transmitting a broadband optical transmission signal via an optical waveguide, having an electronic subsystem and an optical subsystem. The invention also relates to a method for transmitting a broadband optical transmission signal via an optical waveguide, using a transmitting device which comprises an electronic subsystem and an optical subsystem.

BACKGROUND

Higher data rates can be achieved with optical data transmission via optical waveguides compared with wired data transmission systems. The transmitting devices in such optical data transmission systems usually comprise, in addition to an optical subsystem for providing optical signals, an electronic subsystem, which pre-processes the data to be transmitted and drives the optical subsystem.

In order to facilitate a highest possible bandwidth, it is known in such optical data transmission systems based on optical waveguides to provide a plurality of electro-optic modulators in the optical subsystem. Each of the electro-optic modulators typically provides one transmission channel, which is sufficiently spaced in the frequency domain from adjacent transmission channels. The spectral efficiency of such optical data transmission systems is therefore limited.

An electronic subsystem having an appropriately high sample rate is typically required for driving the electro-optic modulators. The same number of digital-to-analog converters is needed as there are electro-optic modulators. Each of these digital-to-analog converters is operated at a sample rate equal to the sample rate of the electro-optic modulator. The signal to be transmitted must be split in the electronic subsystem between the digital-to-analog converters. Digital signal processing apparatuses are typically provided for this purpose, which are operated at a sample rate equal to at least the sample rate of the digital-to-analog converters multiplied by the number of digital-to-analog converters. Therefore such transmitting devices require a relatively high sample rate in the electronic subsystem. Parts suitable for such high sample rates are associated with extremely high costs, however, and usually involve high energy consumption.

SUMMARY

The object of the present invention is to facilitate optical data transmission via an optical waveguide at high spectral efficiency and reduced cost.

In order to achieve the object, a transmitting device according to claim 1 is proposed. The transmitting device according to the invention for transmitting a broadband optical transmission signal via an optical waveguide comprises an electronic subsystem and an optical subsystem, wherein the optical subsystem has N electro-optic modulators for providing N optical signal components, where N is a number greater than 1, wherein the electronic subsystem is configured to transform a baseband signal by a Fourier transform, in particular a discrete Fourier transform, into a frequency spectrum containing N digital coefficient signals, and to provide on the basis of the N digital coefficient signals N analog coefficient signals, and the electro-optic modulators of the optical subsystem are configured to be driven each by one of the N analog coefficient signals.

According to the invention, the electro-optic modulators of the optical subsystem are driven by analog coefficient signals provided by the electronic subsystem. The electronic subsystem is further configured to transform a baseband signal by a Fourier transform, in particular a discrete Fourier transform, into a frequency spectrum containing N digital coefficient signals, and to provide on the basis of the N digital coefficient signals N analog coefficient signals. The components of the electronic subsystem that provide by means of the Fourier transform the digital coefficient signals can be operated at the same sample rate as the electro-optic modulators. Consequently, the electronic subsystem can be operated at a sample rate that is reduced by the factor N compared with the transmitting devices already known from the prior art that have N electro-optic modulators. It is therefore possible to install less expensive electronic components in the electronic subsystem.

Within the meaning of the invention, N is a number greater than 1, in particular a number greater than 1 and less than 1000. For example, N can be 2, 4, 8, 16, 32, 64, 128 or 256.

The electronic subsystem is preferably configured to transform the baseband signal by a discrete Fourier transform (DFT) into the frequency spectrum containing N digital coefficient signals. Particularly preferably, a fast Fourier transform (FFT) is used as the discrete Fourier transform.

According to an advantageous embodiment, the electronic subsystem comprises N digital-to-analog converters for providing the N analog coefficient signals. The N digital-to-analog converters can produce the N analog coefficient signals from the N digital coefficient signals. The sample rate of the N digital-to-analog converters preferably equals the sample rate of the electro-optic modulators of the optical subsystem.

According to an advantageous embodiment, the digital-to-analog converters are each configured to transform one of the N digital coefficient signals by a Fourier transform, in particular a discrete Fourier transform, into a frequency spectrum containing M sub-coefficient signals, and to produce from the M sub-coefficient signals one of the N analog coefficient signals. In a digital-to-analog converter according to such an embodiment, the digital-to-analog conversion is performed by translating the digital input signal of the digital-to-analog converter, in this case one of the digital coefficient signals, into the frequency domain, and subsequent translation back into the time domain in order to obtain an output signal from the digital-to-analog converter, in this case one of the analog coefficient signals. This can reduce even further the sample rate required to operate the digital-to-analog converter, in particular by the factor M. The digital-to-analog converters are preferably configured to transform the digital coefficient signals by a discrete Fourier transform into the frequency spectrum containing M sub-coefficient signals, and then to translate this frequency spectrum by an inverse continuous Fourier transform into an analog coefficient signal. A fast Fourier transform is preferably used as the discrete Fourier transform. Consequently, such an embodiment can provide a transmitting device having two hierarchically arranged Fourier transforms and inverse Fourier transforms, in particular two hierarchically arranged discrete Fourier transforms and inverse continuous Fourier transforms.

It is preferred if the digital-to-analog converter has a plurality of signal sources, in particular a plurality of current sources, by means of which can be produced periodic signals, wherein in particular every two frequencies of the periodic signal have a specified frequency spacing.

Particularly preferably, the digital-to-analog converter comprises M weighting devices, by means of which a weighting of the signal sources can be adjusted according to the M sub-coefficient signals, so that M signal components of the analog coefficient signal can be produced, wherein in particular every two of the M signal components have the specified frequency spacing. The weighting devices can be in the form of amplifying devices. Preferably, one signal source, for example one current source, is assigned to precisely one weighting device, which can be controlled by means of precisely one sub-coefficient signal.

The signal sources preferably each have an apparatus for direct digital synthesis (DDS) of the periodic signal. By means of such an apparatus, an analog periodic signal can be produced by circuit elements that process digital signals, avoiding the need to provide a plurality of oscillators as part of the digital-to-analog converter, which could interfere with one another. Using signal sources that each have a device for direct digital synthesis of the periodic signal makes it possible to produce a multiplicity of periodic signals at a specified frequency spacing while being able to reduce mutual interference between the periodic signals.

According to an advantageous embodiment, the optical subsystem is configured to perform an inverse Fourier transform, in particular an inverse continuous Fourier transform. The optical subsystem can thus produce an optical transmission signal from the N analog coefficient signals.

According to an advantageous embodiment, the optical subsystem has a device for producing N optical carriers. The N optical carriers can be supplied to the N electro-optic modulators, so that the N electro-optic modulators can provide the N optical signal components by each modulating one of the N optical carriers. The N optical carriers preferably have an identical frequency spacing or wavelength spacing with respect to one another.

According to an advantageous embodiment, the device for producing N optical carriers has a frequency comb and an optical demultiplexer. The frequency comb can provide laser light having a frequency spectrum consisting of a plurality of identically spaced discrete frequency lines. These frequency lines can be split by the optical demultiplexer into N optical carriers. With such an embodiment, it is possible to provide an optical carrier to a plurality, in particular all, of the N electro-optic modulators using a single laser as part of the frequency comb.

According to an alternative advantageous embodiment, the apparatus for producing N optical carriers has N lasers. The N lasers are preferably configured in such a way that they can produce the N optical carriers such that each optical carrier has an identical frequency spacing from each of its adjacent optical carriers.

According to an advantageous embodiment, the optical subsystem has an optical multiplexer for combining the N optical signal components into the optical transmission signal. The N signal components provided by the N electro-optic modulators can be combined by the optical multiplexer into a joint optical transmission signal that can be transmitted via an optical waveguide.

According to an advantageous embodiment, the electronic subsystem is configured to be operated at a first sample rate, and the optical subsystem is configured to be operated at a second sample rate, where a ratio of the first sample rate to the second sample rate lies in the range 0.75 to 3, in particular in the range 0.9 to 2.1, for example is 1 or 2.

Contributing to achieving the object stated in the introduction is also a method for transmitting a broadband optical transmission signal via an optical waveguide, using a transmitting device which comprises an electronic subsystem and an optical subsystem, wherein the optical subsystem has N electro-optic modulators, which provide N optical signal components, where N is a number greater than 1, wherein the electronic subsystem transforms a baseband signal by a Fourier transform, in particular a discrete Fourier transform, into a frequency spectrum containing N digital coefficient signals, and provides on the basis of the N digital coefficient signals N analog coefficient signals, and the electro-optic modulators of the optical subsystem are each driven by one of the N coefficient signals.

The same advantages as already described in connection with the transmitting device according to the invention can be achieved with the method according to the invention.

The preferred embodiments and features described in connection with the transmitting device can be applied alone or in combination in the method according to the invention.

A further subject of the invention is the use of a digital-to-analog converter in a transmitting device for transmitting a broadband optical transmission signal via an optical waveguide, wherein the digital-to-analog converter is configured to transform a digital input signal by a Fourier transform, in particular a discrete Fourier transform, into a frequency spectrum containing M sub-coefficient signals, where M is a number greater than 1, and to produce from the M sub-coefficient signals an analog output signal.

The digital-to-analog converter is preferably configured to drive by its analog output signal an electro-optic modulator of the transmitting device.

Further details, features and advantages of the invention appear in the drawings and in the following description of preferred embodiments with reference to the drawings. The drawings illustrate merely exemplary embodiments of the invention, which do not restrict the idea of the invention.

SHORT DESCRIPTION OF THE FIGURES

DETAILED DESCRIPTION

In the various figures, the same parts are always denoted by the same reference signs, and therefore are cited or mentioned generally only once in each case.

Figure 1:
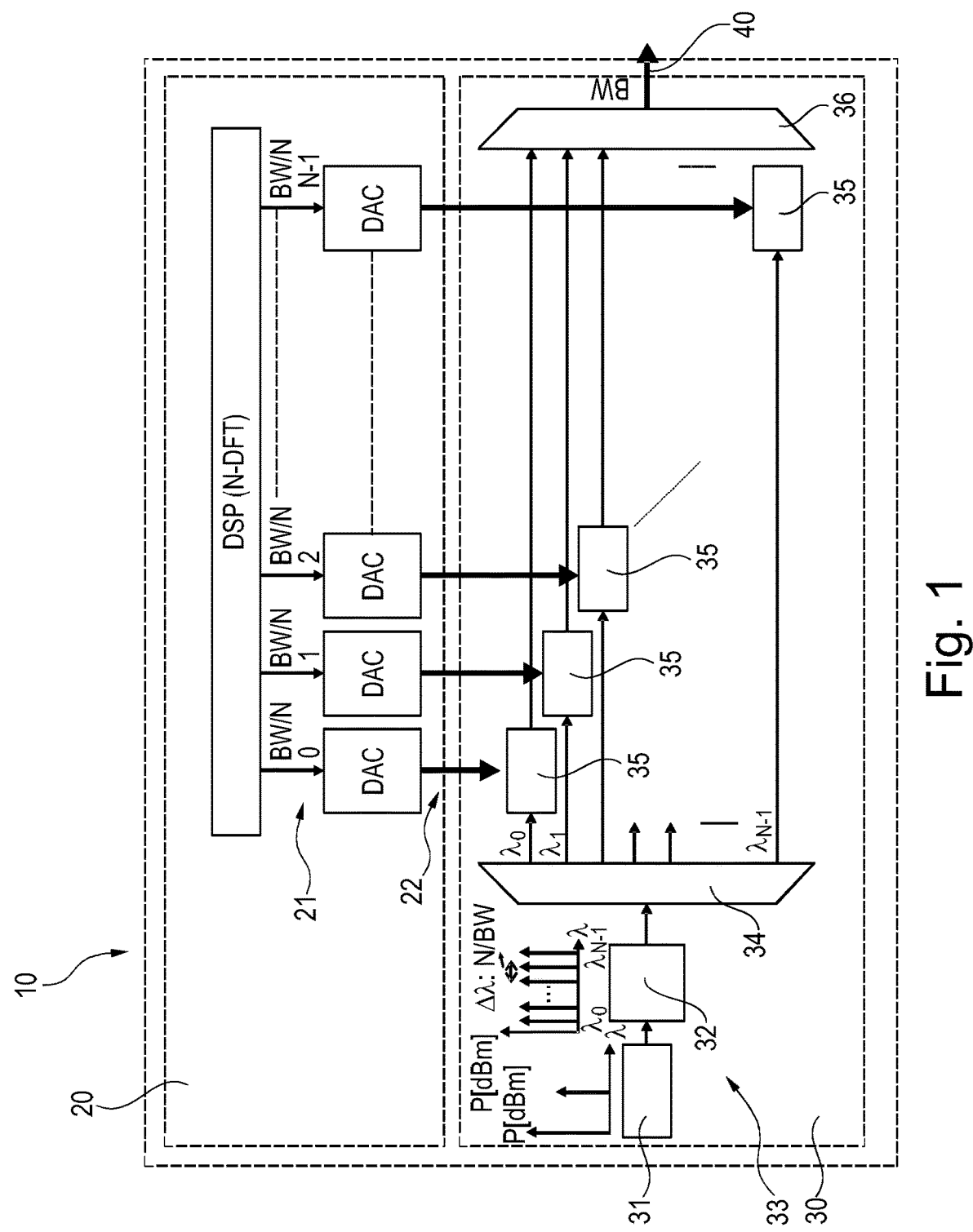
FIG. 1 shows in a schematic block diagram a first exemplary embodiment of a transmitting device according to the invention.

FIG. 1 shows in a schematic block diagram a first exemplary embodiment of a transmitting device 10 according to the invention. The transmitting device 10 is configured to transmit a broadband optical transmission signal via an optical waveguide 40, and can facilitate, for example, a coherent modulation bandwidth of greater than 100 GHz, preferably greater than 150 GHz, for example 160 GHz.

The transmitting device 10 has an electronic subsystem 20 and an optical subsystem 30. The optical subsystem 30 is configured to provide and couple into the optical waveguide 40 the optical transmission signal. For this purpose, the optical subsystem 30 comprises a total of N electro-optic modulators 35, where N is a number greater than 1, for example 2, 4, 8, 16, 32, 64, 128 or 256. The N electro-optic modulators 35 can produce N optical signal components of the optical transmission signal. Each of the electro-optic modulators 35 modulates one of N optical carriers, which are provided by an appropriate apparatus 33 for producing these N carriers. The N optical carriers have different frequencies or wavelengths $\lambda_0$ to $\lambda_{N-1}$, which are each identically spaced from one another in the frequency or wavelength domain. These N optical carriers are produced by means of an appropriate apparatus 33, which comprises a laser 31, a frequency comb 32 and a demultiplexer 34. The laser 31 produces laser light at a specified frequency or wavelength, which is fed into the frequency comb 32. The frequency comb 32 produces from the laser light from the laser 31 modified laser light, the frequency spectrum of which consists of a plurality of identically spaced discrete frequency lines, or the wavelength spectrum of which consists of a plurality of identically spaced discrete wavelength lines $\lambda_0$ to $\lambda_{N-1}$. The individual optical carriers are split by means of the demultiplexer 34, so that they can be supplied separately, one to each of the N electro-optic modulators 35. The modulated optical carriers are then combined by means of a multiplexer 36, so that the optical transmission signal can be coupled into the optical waveguide 40.

The electronic subsystem 20 of the transmitting device 10 is configured to transform a baseband signal by a Fourier transform, in this case a discrete Fourier transform, into a frequency spectrum containing N digital coefficient signals 21, and to provide on the basis of the N digital coefficient signals 21 N analog coefficient signals 22. These analog coefficient signals are used to drive the electro-optic modulators 35 of the optical subsystem 30. According to the first exemplary embodiment, the electronic subsystem 20 has a processor DSP for digital signal processing. This processor DSP performs a discrete Fourier transform on the one baseband signal, producing a total of N digital coefficient signals 21. These digital coefficient signals 21 are each supplied to a digital-to-analog converter DAC, which converts the digital coefficient signals 21 into analog coefficient signals 22. The components of the electronic subsystem 20, in particular of the processor DSP and the digital-to-analog converter DAC, can be operated at the same sample rate as the electro-optic modulators 35. Alternatively, it is possible to operate the components DSP, DAC of the electronic subsystem 20 at a sample rate that lies by a factor in the range 0.75 to 3, in particular in the range 0.9 to 2.1, for example is 1 or 2. In either case, in the exemplary embodiment, by virtue of the low sample rate in the electronic subsystem 20 compared with the prior art, it is possible to install lower-cost electronic components DSP, DAC in the electronic subsystem 20.

A high spectral efficiency and a high coherent modulation bandwidth can be achieved by the transmitting device according to the first exemplary embodiment. The optical transmission signal is obtained by a discrete Fourier transform performed in the electronic subsystem 20 and by an inverse continuous Fourier transform performed in the optical subsystem 30. Therefore the analog transmission signal has a high bandwidth and cannot be distinguished from a transmission signal produced by an alternative transmitting device having a single electro-optic modulator operated at a sample rate that is N-times higher than the transmitting device according to the first exemplary embodiment.

Figure 2:
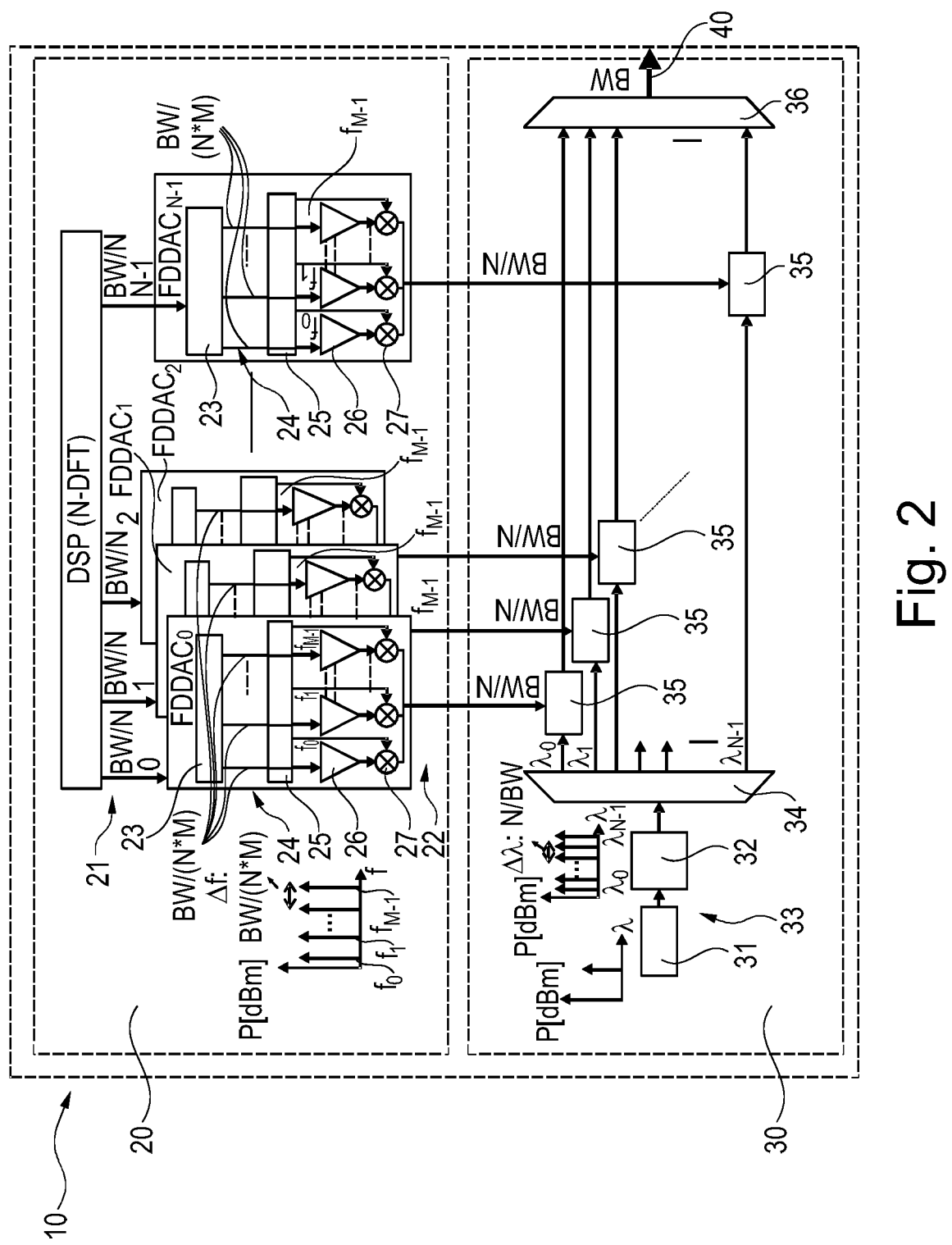
FIG. 2 shows in a schematic block diagram a second exemplary embodiment of a transmitting device according to the invention.

FIG. 2 shows a second exemplary embodiment of a transmitting device according to the invention, which is likewise configured to transmit a broadband optical transmission signal via an optical waveguide 40. According to the second exemplary embodiment, the transmitting device can likewise facilitate a coherent modulation bandwidth of greater than 100 GHz, preferably greater than 150 GHz, for example 160 GHz.

Just like the transmitting device 10 according to the first exemplary embodiment, the transmitting device 10 according to the second exemplary embodiment has an electronic subsystem 20 and an optical subsystem 30. The optical subsystem 30 according to the second exemplary embodiment is identical to the optical subsystem 30 according to the first exemplary embodiment, and therefore reference is made to the description relating to FIG. 1.

In the second exemplary embodiment, there are differences in the design of the electronic subsystem 20 compared with the first exemplary embodiment. According to the second exemplary embodiment, the N digital-to-analog converters FDDAC are each configured to transform one of the N digital coefficient signals 21 by a Fourier transform 23, in this case a discrete Fourier transform, into a frequency spectrum containing M sub-coefficient signals 24, and to produce from the M the sub-coefficient signals 24 one of the N analog coefficient signals 21. Thus the conversion of a digital coefficient signal 21 into the corresponding analog coefficient signal 22 is performed by discrete Fourier transform and inverse continuous Fourier transform in succession. The digital-to-analog converter FDDAC according to the second exemplary embodiment can be operated at a sample rate reduced by the factor M compared with the digital-to-analog converter DAC according to the first exemplary embodiment.

In addition to a unit for the discrete Fourier transform 23, the digital-to-analog converter FDDAC comprises a plurality of signal sources, in particular a plurality of current sources, which are grouped into a common block 25 in FIG. 2. Periodic signals can be produced by these signal sources, where in particular every two frequencies $f_0, f_1 \ldots f_{N-1}$ of the periodic signal have a specified frequency spacing $\Delta f$. In addition, the digital-to-analog converter FDDAC comprises a total of M weighting devices 26, by means of which a weighting of the signal sources can be adjusted according to the M sub-coefficient signals 24. The signal sources can have, for example, an apparatus for direct digital synthesis (DDS) of the periodic signal. The weighting devices 26 are in the form of amplifying devices in the exemplary embodiment. One signal source, for example one current source, is assigned to precisely one weighting device 26, which can be controlled by means of precisely one of the N sub-coefficient signals 24. One mixer 27 is used in each case to mix one of the weighted sub-coefficient signals 24 and the associated periodic signal of frequency $f_0$, $f_1$ . . . $f_{N-1}$.

Figure 3:
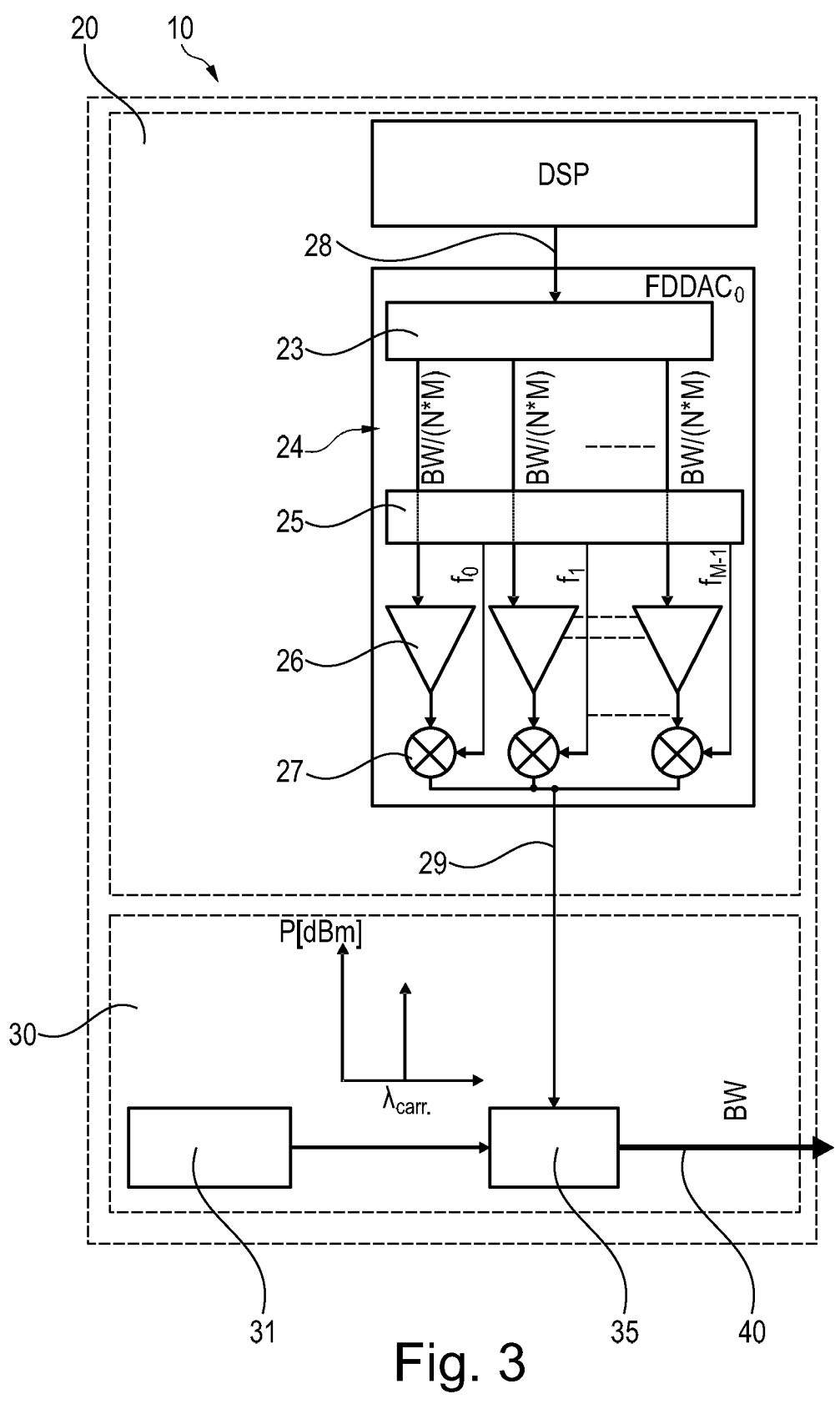
FIG. 3 shows an exemplary embodiment of a use according to the invention of a digital-to-analog converter in a transmitting device for transmitting a broadband optical transmission signal via an optical waveguide.

FIG. 3 shows a further transmitting device 10 for transmitting a broadband optical transmission signal via an optical waveguide 40, which comprises an electronic subsystem 20 and an optical subsystem 30. Just as in the transmitting device shown in FIG. 2, in this transmitting device 10 is also used a digital-to-analog converter FDDAC that is configured to transform a digital input signal 28 by a discrete Fourier transform 23 into a frequency spectrum containing M coefficient signals 24, where N is a number greater than 1, and to produce from the M coefficient signals 24 an analog output signal 29. The analog output signal 29 is used to drive a single electro-optic modulator 35 of the optical subsystem 30. This electro-optic modulator 35 is in the form of a particularly broadband modulator. In order to achieve the same bandwidth as in the systems shown in FIG. 1 and FIG. 2, this modulator must have N times the bandwidth. By using the digital-to-analog converter FDDAC, however, which is based on the concatenation of discrete Fourier transform and inverse continuous Fourier transform, the sample rate in the electronic subsystem 20 can be lowered. Thus this embodiment can also achieve a high spectral efficiency at reduced cost.

LIST OF REFERENCES

10 transmitting device
20 electronic subsystem
21 digital coefficient signals
22 analog coefficient signals
23 discrete Fourier transform
24 sub-coefficient signals
25 block containing a plurality of signal sources
26 weighting devices
27 mixers
28 input signal
29 output signal
30 optical subsystem
31 laser
32 frequency comb
33 device for producing N optical carriers
34 optical demultiplexer
35 electro-optic modulator
36 optical multiplexer
40 optical waveguide
BW bandwidth
DAC digital-to-analog converter
DSP digital signal processing device

The invention claimed is:

1. A transmitting device for transmitting a broadband optical transmission signal via an optical waveguide, having an electronic subsystem and an optical subsystem, wherein the optical subsystem has N electro-optic modulators for providing N optical signal components, where N is a number greater than 1, wherein the electronic subsystem is configured to transform a baseband signal by a Fourier transform or a discrete Fourier transform, into a frequency spectrum containing N digital coefficient signals, and to provide, on a basis of the N digital coefficient signals, N analog coefficient signals, wherein the electro-optic modulators of the optical subsystem are each configured to be driven by one of the N analog coefficient signals, and wherein the electronic subsystem comprises N digital-to-analog converters for providing the N analog coefficient signals.

2. The transmitting device as claimed in claim 1, wherein the N digital-to-analog converters are each configured to transform one of the N digital coefficient signals by a Fourier transform; or a discrete Fourier transform, into a frequency spectrum containing M sub-coefficient signals, and to produce from the M sub-coefficient signals, one of the N analog coefficient signals.

3. The transmitting device as claimed in claim 2, wherein the N digital-to-analog converters have a plurality of signal sources, or a plurality of current sources, by means of which can be produced periodic signals, wherein every two frequencies of the periodic signals have a specified frequency spacing.

4. The transmitting device as claimed in claim 3, wherein the N digital-to-analog converters have M weighting devices, by means of which a weighting of the plurality of signal sources can be adjusted according to the M sub-coefficient signals, so that M signal components of the N analog coefficient signals can be produced, wherein every two of the M signal components have the specified frequency spacing.

5. The transmitting device as claimed in claim 3, wherein the plurality of signal sources have an apparatus for direct digital synthesis of the periodic signals.

6. The transmitting device as claimed in claim 1, wherein the optical subsystem is configured to perform an inverse Fourier transform or an inverse continuous Fourier transform.

7. The transmitting device as claimed in claim 1, wherein the optical subsystem has a device for producing N optical carriers.

8. The transmitting device as claimed in claim 7, wherein the device for producing N optical carriers has a frequency comb and an optical demultiplexer.

9. The transmitting device as claimed in claim 7, wherein the device for producing N optical carriers has N lasers.

10. The transmitting device as claimed in claim 1, wherein the optical subsystem has an optical multiplexer for combining the N optical signal components into the broadband optical transmission signal.

11. The transmitting device as claimed in claim 1, wherein the electronic subsystem is configured to be operated at a first sample rate, and the optical subsystem is configured to be operated at a second sample rate, where a ratio of the first sample rate to the second sample rate lies in a range 0.75 to 3, in or in a range 0.9 to 2.1, or is 1 or 2.

12. A method for transmitting a broadband optical transmission signal via an optical waveguide, using a transmitting device which comprises an electronic subsystem and an optical subsystem, wherein the optical subsystem has N electro-optic modulators, which provide N optical signal components, where N is a number greater than 1, wherein the electronic subsystem transforms a baseband signal by a Fourier transform or a discrete Fourier transform, into a frequency spectrum containing N digital coefficient signals, and provides on the basis of the N digital coefficient signals N analog coefficient signals, and wherein the electro-optic modulators of the optical subsystem are each driven by one of the N analog coefficient signals, and wherein the electronic subsystem comprises N digital-to-analog converters for providing the N analog coefficient signals.

\* \* \* \* \*